United States Patent
Adyilamuriyil et al.

(10) Patent No.: US 8,615,503 B2
(45) Date of Patent: Dec. 24, 2013

(54) METHOD FOR ATTACHING PARTITION ONLINE TO RANGE PARTITIONED TABLE

(75) Inventors: Lynette D Adyilamuriyil, Olathe, KS (US); Naresh K Chainani, Portland, OR (US); Raghupathi K Murthy, Union City, CA (US); Sitaram Vemulapalli, San Jose, CA (US); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/174,823

(22) Filed: Jul. 1, 2011

(65) Prior Publication Data
US 2013/0006950 A1    Jan. 3, 2013

(51) Int. Cl.
    G06F 17/30    (2006.01)
(52) U.S. Cl.
    USPC ............ 707/703; 707/704; 707/769; 707/830
(58) Field of Classification Search
    USPC ................................. 707/704, 715, 802, 769
    See application file for complete search history.

(56) References Cited

U.S. PATENT DOCUMENTS

| | | | |
|---|---|---|---|
| 6,105,026 A * | 8/2000 | Kruglikov et al. ............... 1/1 |
| 6,370,529 B1 * | 4/2002 | Kruglikov et al. ............ 707/704 |
| 6,845,375 B1 * | 1/2005 | Sinclair .......................... 1/1 |
| 7,213,025 B2 * | 5/2007 | Sinclair et al. ................. 1/1 |
| 7,359,923 B2 | 4/2008 | Beck et al. |
| 7,480,653 B2 | 1/2009 | Cornwell et al. |
| 7,890,482 B2 | 2/2011 | Cornwell et al. |
| 7,890,541 B2 * | 2/2011 | Teng et al. .................... 707/802 |
| 2004/0260897 A1 * | 12/2004 | Sanchez et al. ............... 711/162 |
| 2006/0271557 A1 * | 11/2006 | Harward et al. ................ 707/10 |
| 2007/0198517 A1 * | 8/2007 | Bresch et al. ..................... 707/8 |
| 2007/0198591 A1 * | 8/2007 | Teng et al. .................... 707/200 |
| 2008/0104137 A1 | 5/2008 | Beck et al. |
| 2009/0144303 A1 | 6/2009 | Bhide et al. |
| 2009/0182779 A1 * | 7/2009 | Johnson ........................ 707/200 |

(Continued)

FOREIGN PATENT DOCUMENTS

WO    2008109562    9/2008

OTHER PUBLICATIONS

IBM et al, "Method to Decide on the Best Partitioning Columns and Best Range Values for Creating the Range Partition Tables"; IPCOM000200914D; Oct. 29, 2010; all pages.

(Continued)

*Primary Examiner* — Sherief Badawi
(74) *Attorney, Agent, or Firm* — North Shore Patents, P.C.; Michele Liu Baillie (57) ABSTRACT

Method for attaching one or more tables online to a range partitioned table, includes: starting a child transaction; obtaining an exclusive lock on a source table; obtaining an intent exclusive lock on a target table; soft invalidating queries on the target table where compiled form of queries are cached for reuse; attaching the source table(s) to the target table as a new partition(s) of the target table; modifying indices and table structure of the target table to reflect the attaching of the new partition; committing the child transaction; and releasing the exclusive lock and the intent exclusive lock, where concurrently running queries over the target table continue to run without considering the partition until the intent exclusive lock and the exclusive lock are released. Queries on the target table only consider existing partitions when the attaching is in progress. The new partition is available once the attach operation is complete.

12 Claims, 5 Drawing Sheets

(56) References Cited

U.S. PATENT DOCUMENTS

| | | |
|---|---|---|
| 2009/0235043 A1 | 9/2009 | Jaiswal et al. |
| 2009/0248710 A1* | 10/2009 | McCormack et al. ........ 707/100 |
| 2010/0030793 A1 | 2/2010 | Cooper et al. |
| 2010/0153349 A1 | 6/2010 | Schroth |
| 2010/0198800 A1 | 8/2010 | Nettleton et al. |
| 2010/0281013 A1* | 11/2010 | Graefe ........................ 707/715 |
| 2012/0089566 A1* | 4/2012 | Effern et al. .................. 707/611 |
| 2012/0317134 A1* | 12/2012 | Bourbonnais et al. ........ 707/769 |

OTHER PUBLICATIONS

IBM et al., "Automatic Table Partitioning Roll-In"; IPCOM000147709D; Mar. 22, 2007; all pages.

Beck, K., "Viper Preview: Range Partitioning Fundamentals"; IDUG DB2 LUW, IBM Tampa Convention Center; May 11, 2006; all pages.

Song, J. et al., "NPA: Increased Partitioning Approach for Massive Data in Real-Time Data Warehouse"; ITCS 2nd International Conference; Aug. 11-13, 2010; pp. 1-6.

* cited by examiner

FIG. 1

Target Table 201 = sales.orders table

| | |
|---|---|
| jan_partition | 1/1/2010 to 1/31/2010 |
| feb_partition | 2/1/2010 to 2/28/2010 |
| march_partition | 3/1/2010 to 3/31/2010 |
| april_partition | 4/1/2010 to 4/30/2010 |
| may_partition | 5/1/2010 to 5/31/2010 |
| june_partition | 6/1/2010 to 6/30/2010 |
| july_partition | 7/1/2010 to 7/31/2010 |
| august_partition | 8/1/2010 to 8/31/2010 |
| september_partition | 9/1/2010 to 9/30/2010 |
| october_partition | 10/1/2010 to 10/31/2010 |
| november_partition | 11/1/2010 to 11/30/2010 |

Source Table 202 = december_orders_table

| | |
|---|---|
| december_table | 12/1/2010 to 12/31/2010 |

ATTACH

Modified Target Table 203

| | |
|---|---|
| jan_partition | 1/1/2010 to 1/31/2010 |
| feb_partition | 2/1/2010 to 2/28/2010 |
| march_partition | 3/1/2010 to 3/31/2010 |
| april_partition | 4/1/2010 to 4/30/2010 |
| may_partition | 5/1/2010 to 5/31/2010 |
| june_partition | 6/1/2010 to 6/30/2010 |
| july_partition | 7/1/2010 to 7/31/2010 |
| august_partition | 8/1/2010 to 8/31/2010 |
| september_partition | 9/1/2010 to 9/30/2010 |
| october_partition | 10/1/2010 to 10/31/2010 |
| november_partition | 11/1/2010 to 11/30/2010 |
| december_partition | 12/1/2010 to 12/31/2010 |

FIG. 4 (con't)

METHOD FOR ATTACHING PARTITION ONLINE TO RANGE PARTITIONED TABLE

BACKGROUND

Some database systems store transactional or time cyclic data. To improve transactional throughput, the data can be distributed in different partitions to balance the workload. For time cyclic data management, data for a defined period of time (such as each hour, day, week, month, quarter, year, etc.) is kept in distinct partitions to improve the manageability of data. One common operation on the database table is to load new sets of data. Three ways of loading the new sets of data include: simple INSERTs into the table; loading the data via utilities; and attaching a table with data for a new time period to an existing table within the database.

Simple INSERTs insert the new data into the database table row by row and updates the database table indices simultaneously. During the INSERTs, the rest of the database table is available for queries, subject to isolation level requirements. However, this approach is slow and resource intensive.

Loading the new data using utilities can be faster than using simple INSERTs, however, to raise performance, the database table is locked, which can make the application accessing this table, even if infrequently, unavailable.

The new data may also be prepared in a separate table, and this separate table can then be attached to the database table through an ATTACH operation. The ATTACH operation is quicker than the simple INSERTs and the loading using utilities. However, since the ATTACH operation modifies the physical structure of the table, an exclusive lock to the database table is taken. In taking an exclusive lock on the database table, every query on the database table will have to wait or will timeout. Furthermore, the ATTACH operation itself cannot proceed until it either drains or preempts all existing access to the table. If draining is the only option and the existing access involves a long-running report, the ATTACH operation is unable to proceed until the report completes or is terminated. For database systems in a 24/7 environment, delay or downtime to perform the ATTACH operation may be undesirable.

BRIEF SUMMARY

According to one embodiment of the present invention, a method for attaching a partition online to a range partitioned table, comprises: obtaining an exclusive lock on one or more source tables; obtaining an intent exclusive lock on a target table; attaching the source table to the target table as a new partition of the target table; modifying indices and table structure of the target table to reflect the attaching of the new partition; and releasing the exclusive lock on the source table and the intent exclusive lock on the target table, wherein currently running queries over the target table continue to run without considering the new partition until the exclusive lock and the intent exclusive lock are released.

In one aspect of the present invention, the obtaining the exclusive lock on the source table and the obtaining the intent exclusive lock on the target table comprise: receiving an issuance of an attach command; determining whether predetermined requirements for the source table and the target table are met; and in response to determining that the predetermined requirements for the source table and the target table are met, obtaining the exclusive lock on the source table and obtaining the intent exclusive lock on the target table.

In one aspect of the present invention, the attaching the source table to the target table as the new partition of the target table comprises: acquiring a mutex controlling a dictionary partition list of the target table; setting an online alter flag indicating that an attach operation is in progress; releasing the mutex; performing soft invalidation of precompiled forms of queries cached for reuse on the target table; and attaching the source table to the target table as the new partition of the target table.

In one aspect of the present invention, the modifying the indices and the table structure of the target table to reflect the attaching of the new partition comprises: beginning a child transaction before obtaining the exclusive lock and the intent exclusive lock; updating a target table catalog to reflect the table structure of the modified target table; modifying the indices for the target table in the catalog to reflect the new partition; removing catalog entries for the source table; acquiring the mutex; updating the dictionary partition list with new partition information and a timestamp associated with the new partition; unsetting the online alter flag; releasing the mutex; and committing the child transaction before releasing the exclusive lock and the intent exclusive lock.

In one aspect of the present invention, the releasing the exclusive lock on the source table and the intent exclusive lock on target table comprises: committing the child transaction.

In one aspect of the present invention, the method further comprises: receiving a query to be run on the target table; determining a query execution timestamp; performing the query on target table partitions existing before the query execution timestamp.

In one aspect of the present invention, the method further comprises: determining whether the query requires creation of one or more partitions on the target table; in response to determining that the query requires the creation of the one or more partitions on the target table, determining whether an attach operation on the target table is in progress; and in response to determining that the attach operation on the target table is in progress, queuing the query.

In one aspect of the present invention, the method further comprises: after the release of the intent exclusive lock and the exclusive lock, unsetting the ONLINE alter flag; and performing the queued queries on the modified target table.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
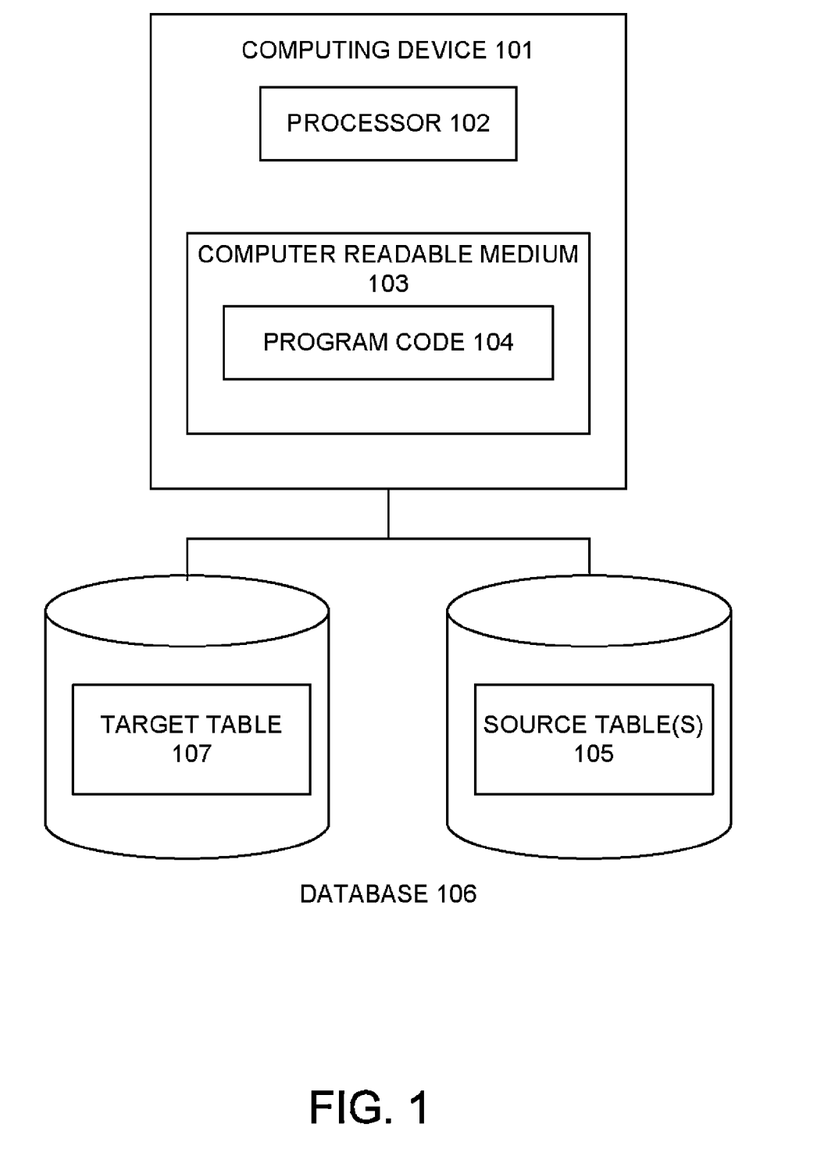
FIG. 1 illustrates an embodiment of a system for attaching a partition online to a range partitioned table according to the present invention.

FIG. 1 illustrates an embodiment of a system for attaching a partition online to a range partitioned table according to the present invention. The system comprises a computing device 101, which is operationally coupled to a processor 102 and a computer readable medium 103. The computer readable medium 103 stores computer readable program code 104 for implementing the method of the present invention. The processor 102 executes the program code 104 to attach one or more source tables 105 with the same schema to a target table 107 of a database 106 according to the various embodiments of the present invention.

In one embodiment, the computing device 101 comprises a database server, such as a database server running a large transaction system. In another embodiment, the processor 102 of the computing device 101 executes the program code of an application (not shown) with a database embedded. Other types of computing devices may be used to implement the method of the present invention without departing from the spirit and scope of the present invention.

Figure 2:
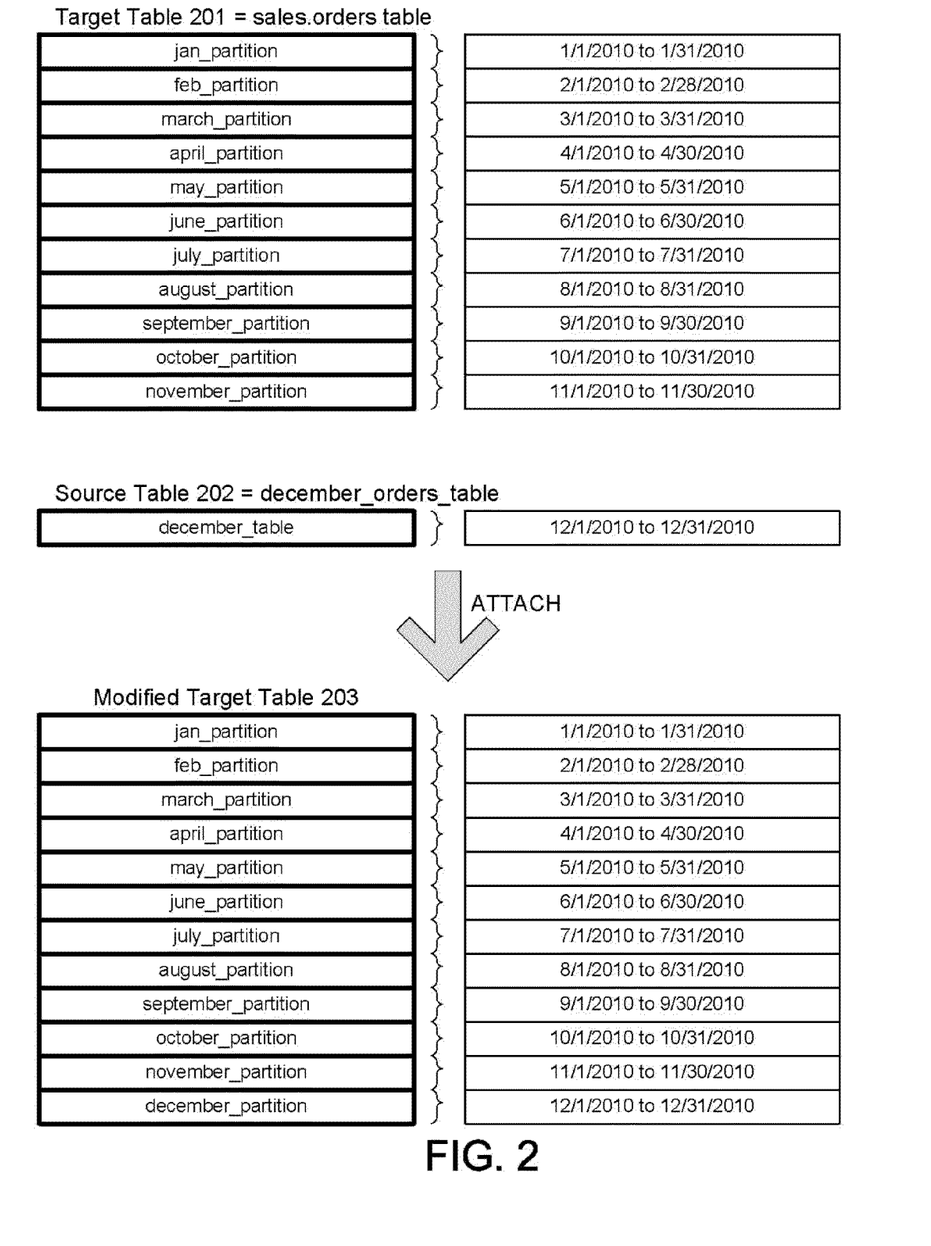
FIG. 2 illustrates example target and source tables according to an embodiment of the present invention.

FIG. 2 illustrates example target and source tables according to an embodiment of the present invention. Assume in this example that the target table 201 comprises a plurality of partitions that store data in monthly periods, and the target table 201 contains data for January through November 2010. Assume also that new data for December 2010 is to be loaded. The December 2010 data are prepared in a separate source table 202. The source table 202 is then attached to the target table 201, as a new partition of the target table 201. After the attachment, the modified target table 203 contains data for January through December 2010. The attachment of the source table 202 to the target table 201 is described further below with reference to FIGS. 3 and 4.

Figure 3:
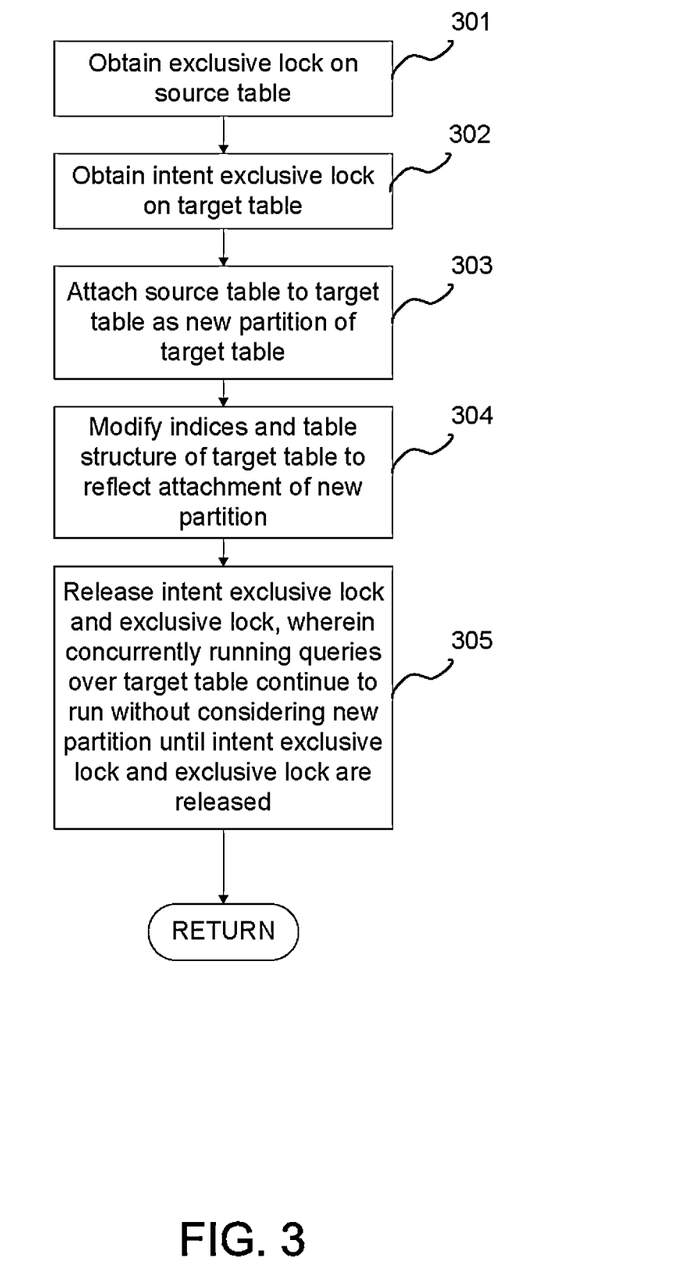
FIG. 3 is a flowchart illustrating an embodiment of a method for attaching a partition online to a range partitioned table according to the present invention.

FIG. 3 is a flowchart illustrating an embodiment of a method for attaching a partition online to a range partitioned table according to the present invention. Referring to FIGS. 1 and 3, the method begins obtaining an exclusive lock on the source table 105 (301) to avoid read/writes to the source table 105 during the attach operation. An intent exclusive lock is obtained on the target table 107 (302). Intent locks are used to establish a lock hierarchy. The intent lock shows the future intention of the lock manager to acquire locks on a specific unit of data for a particular transaction. The intent exclusive lock indicates that the transaction will modify some (but not all) resources in the table or page by placing exclusive locks. Once the exclusive and intent exclusive locks are obtained, the method attaches the source table 105 to the target table 107 as a new partition of the target table 107 (303). The indices and the table structure of the target table 107 are modified to reflect the attachment of the new partition (304). Once the attachment is complete, the intent exclusive lock on the target table 107 and the exclusive lock on the source table 105 are released (305). Since addition of the new partition does not affect the data or the data structure of the existing partitions of the target table 105, concurrently running queries over the target table 107 may continue to run during the attach operation. To avoid consistency problems, the queries are run without considering the partition being added, until the attach operation completes and the intent exclusive and exclusive locks are released. In this manner, downtime for loading new sets of data to the database 106 is reduced, increasing the availability of the database 106.

Figure 4:
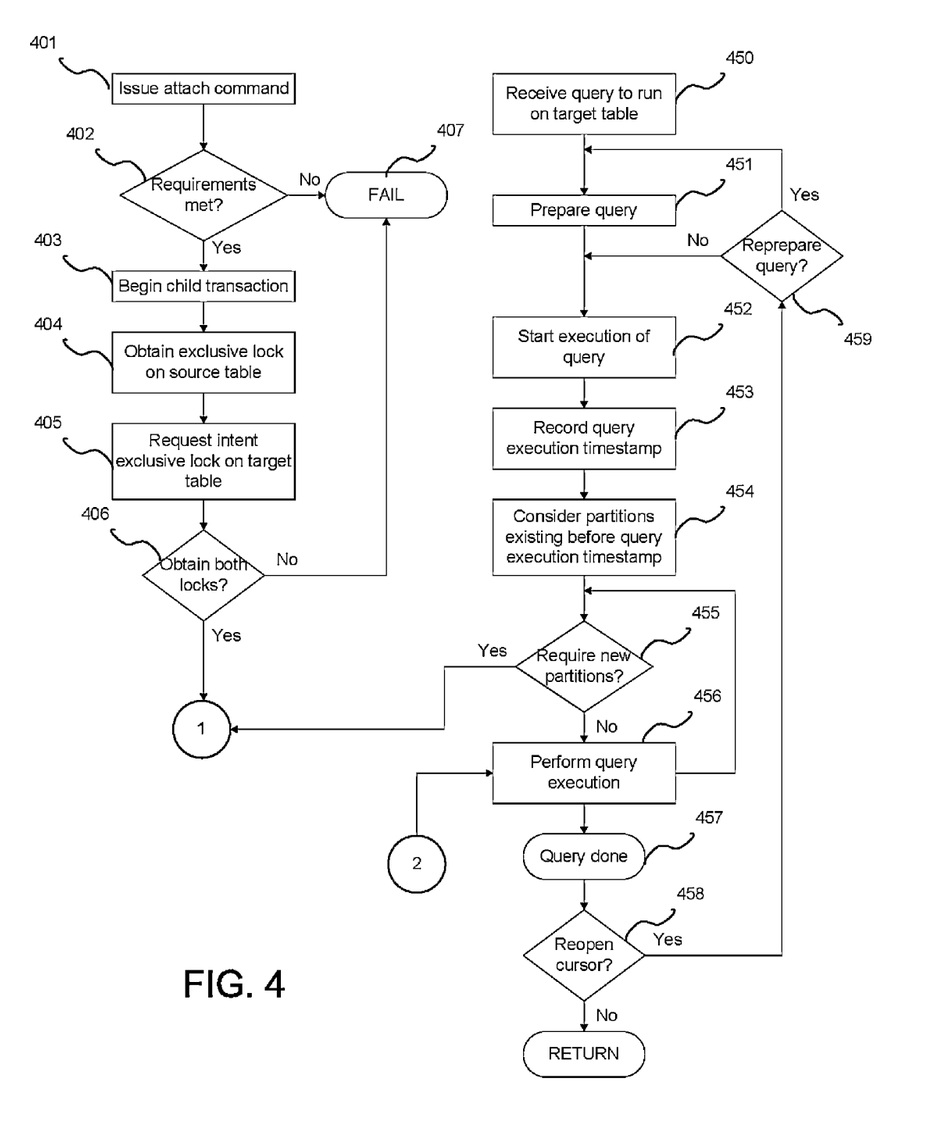
FIG. 4 is a flowchart illustrating in more detail the embodiment of the method for attaching a partition online to a range partitioned table according to the present invention.

FIG. 4 is a flowchart illustrating in more detail the embodiment of the method for attaching a partition online to a range partitioned table according to the present invention. In describing FIG. 4, the example illustrated in FIG. 2 will be used. The method begins when a connection to a database is opened, and an attach command is issued (401). For the example illustrated in FIG. 2, the command may be as follows:

```
ALTER FRAGMENT ONLINE ON TABLE "sales".orders
ATTACH december_orders_table as PARTITION december_partition
    values < DATE("01-01-2011");
When attaching multiple source tables, the command may be as follows:
ALTER FRAGMENT ONLINE ON TABLE "sales".orders
ATTACH
december_orders_table as PARTITION
    December_2010_partition values < DATE("01-01-2011")
january_2011_orders_tab as PARTITION
    january_2011_partition value < DATE("02-01-2011");
```

The method then determines if the requirements for the target table 201 and the source table 202 are met (402). Example requirements for the target table may include: non-overlapping partitions; and all indices on the target table are partitioned using the same partition strategy as the table. Example requirements for the source table may include: source table schema are to match the target table; source table contains only one partition; source table has constraints matching the new expression in the target table (e.g., with the example in FIG. 2, the december_orders_table are to have a constraint on the partition key restricting the key values from Dec. 1, 2010 to Dec. 31, 2010); indices on the target table are to be attached; and source table is to have the same indices as the target table. If the requirements are not met, then the attach operation fails (406).

In response to determining that the requirements are met (402), the method begins a child transaction (403). The child transaction starts a nested transaction that may be independently committed or rolled back. Below is an example logical sequence:

```
BEGIN WORK; /Begin the parent transaction/
    UPDATE tab1 SET c1 = c1 + 1; /still in parent transaction/
        BEGIN CHILD WORK; /start the child transaction/
            UPDATE tab2 SET c2 = c2 + 1;
        COMMIT CHILD WORK; /changes done in the child
            transaction is committed/
ROLLBACK WORK; /parent transaction is rolled back/Here, the parent
transaction is rolled back, but the child transaction's changes to tab2 are
still committed. In this manner, use of the child transaction addresses any
interdependent locking issues that may occur in the parent-child
transaction.
```

The method then obtains an exclusive lock on the source table 202 (404) and requests an intent exclusive lock on the target table 201 (405). If either lock fails to be obtained (406), the attach operation fails (407). The intent exclusive lock controls the intent to modify the table structure of the target table 201, such that only one attach operation can occur at a time. Other structural modifications to the target table 201 are also prevented, such as schema modifications.

Once the exclusive lock and the intent exclusive lock are obtained, the method performs the attach operation, while sessions concurrent with the attach operation can read and modify the data in the existing partition in the target table 201.

Concurrent with the attach operation, queries may continue to be issued on the target table 201. These queries use the available partitions on the target table 201 at the start of the query. When such a query is received (450), the query is prepared (451), and its execution is started (452). The method records the query execution timestamp (453) (e.g. SELECT, DELETE). The query execution timestamp is compared with timestamps associated with each partition of the target table 201, and the execution of the query considers the partitions with timestamps existing before the query execution timestamp (454). Thus, the query execution timestamp is used to control whether to consider a partition on the target table 201 to evaluate the query, as described further below.

The method further determines whether the query is required to create one or more new partitions ONLINE on the target table 201 (455). In response to determining that the query is required to create one or more new partitions ONLINE on the target table 201, the method acquires the mutex (mutual exclusion object) controlling the dictionary partition list of the target table 201 (408) so that the partition list cannot be modified. The partition list stores the partition structure of the target table 201 in memory. The method determines whether an online alter flag is set (409). A set online alter flag indicates that an attach operation is in progress. The setting of the online alter flag ensures that there is only one ONLINE operation on the target table 201 at a time. In response to determining that the online alter flag is set, and a query is currently executing, the query is queued, and the mutex is released (410). Otherwise, the method sets the online alter flag and releases the mutex (411).

When an attach operation is not in progress (412), the method performs the query per the standard algorithm (456). When an attach operation is in progress (412), and where the compiled form of queries are cached for reuse, the method performs a soft invalidation of precompiled queries referencing the target table 201 (413). The soft invalidation marks the cached entries as invalid for new use. This allows existing queries to continue running and referring to the compiled form in the cache, while at the same time, allowing the attach operation to proceed concurrently to attach the source table 202 a new partition of the target table 201. When the same query is reissued on the target table after the completion of the attach operation, due to the soft invalidation, the query is recompiled based on latest dictionary partition list which includes information on the newly attached partition.

Then, the source table 202 is attached to the target table 201 as a new partition, and the target table catalog is updated to reflect the attachment of the new partition (414). The indices for the modified target table 203 in the catalog are modified to indicate the attachment, and the catalog entries for the source table 202 are removed (415). The method acquires the mutex controlling the dictionary partition list of the modified target table 203 (416) and updates the dictionary with the new partition information associated with a timestamp in the partition structure (417). This timestamp associated with the new partition is used during query execution, described above with reference to block 454. During query execution, if the query comes across the new partition in the dictionary partition list that is attached after the query started execution, then the new partition's associated timestamp will be after the query execution timestamp. The new partition will not be considered in the performance of the query execution until the cursor on the query is reopened after the attach operation is completed. At the next opening of the cursor (458), the query is reprepared if required (459). The timestamp for the query is updated, and the index partitions to scans are automatically reconsidered. The newly attached partition will be scanned if it is qualified after partition pruning. This avoids the need for a query recompilation operation.

Returning to block 418, the method unsets the online alter flag and releases the mutex on the dictionary partition list of the modified target table 203 (418). The child transaction is committed, and the intent exclusive lock on the target table 201/203 and the exclusive lock on the source table 202 are released (419). The online attach operation is thus complete (420). In this embodiment, the source table's underlying storage in the modified target table 203 is reused, but the catalog and dictionary entries are modified online. Because of the requirements, set forth above, there are no data movements or index rebuilds during the attach online operation. Thus, the attach operation can occur quickly.

Upon the completion of the attach operation, the queries queued in block 410 are performed on the modified target table 203. By queuing queries in this way, serial partition creation and attach is enforced.

In the above manner, certain queries may be performed on the existing partitions of the target table 201 concurrently with an attach operation without error, thus reducing the downtime of the database. Further, this embodiment will not conflict with any off-line attach operations, since the off-line attach operations require exclusive lock and access to the target table 201.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for attaching a partition online to a range partitioned table, comprising:

beginning a child transaction;

obtaining an exclusive lock on one or more source tables;

obtaining an intent exclusive lock on a target table;

acquiring a mutex controlling a dictionary partition list of the target table;

setting an online alter flag indicating that an attach operation is in progress;

attaching the source table to the target table as the new partition of the target table;

updating a target table catalog to reflect the table structure of the modified target table;

modifying indices for the target table in the catalog to reflect the new partition;

removing catalog entries for the source table;

updating the dictionary partition list with new partition information with a timestamp associated with the new partition;

unsetting the online alter flag;

releasing the mutex;

committing the child transaction; and releasing the exclusive lock on the source table and the intent exclusive lock on the target table, wherein concurrently running queries over the target table continue to run without considering the new partition until the intent exclusive lock and the exclusive lock are released.

2. The method of claim 1, wherein the obtaining the exclusive lock on the source table and the obtaining the intent exclusive lock on the target table comprise:

receiving an issuance of an attach command;

determining whether pre-determined requirements for the source table and the target table are met; and in response to determining that the pre-determined requirements for the source table and the target table are met, obtaining the exclusive lock on the source table and obtaining the intent exclusive lock on the target table.

3. The method of claim 1, wherein compiled forms of queries are cached for reuse on the target table, wherein the obtaining the exclusive lock on the source table and the obtaining the intent exclusive lock on the target table further comprise:

performing soft invalidation of the compiled queries on the target table by marking cached entries as invalid for new use.

4. A method for attaching a partition online to a range partitioned table, comprising:

receiving a query to be run on a target table;

determining whether the query requires creation of one or more partitions on the target table;

in response to determining that the query requires the creation of the one or more partitions on the target table, determining whether an attach operation on the target table is in progress;

in response to determining that the attach operation on the target table is in progress:
queuing the query;
obtaining an exclusive lock on one or more source tables;
obtaining an intent exclusive lock on the target table;
attaching the source table to the target table as a new partition of the target table;
modifying indices and table structure of the target table to reflect the attaching of the new partition; and
releasing the exclusive lock on the source table and the intent exclusive lock on the target table,
wherein concurrently running queries over the target table continue to run without considering the new partition until the intent exclusive lock and the exclusive lock are released, comprising:
determining a query execution timestamp, and
performing the query on target table partitions existing before the query execution timestamp.

5. The method of claim 4, further comprising:

after the release of the intent exclusive lock and the exclusive lock, performing the queued query on the modified target table.

6. A computer program product for attaching a partition online to a range partitioned table, the computer program product comprising:

a computer readable storage memory having computer readable program code embodied therewith, the computer readable program code configured to:
begin a child transaction;
obtain an exclusive lock on one or more source tables;
obtain an intent exclusive lock on a target table;
acquire a mutex controlling a dictionary partition list of the target table;
set an online alter flag indicating that an attach operation is in progress;
attach the source table to the target table as the new partition of the target table;
update a target table catalog to reflect the table structure of the modified target table;
modify indices for the target table in a catalog to reflect the new partition;
remove catalog entries for the source table;
update the dictionary partition list with new partition information and a timestamp associated with the new partition;
unset the online alter flag;
release the mutex;
commit the child transaction; and
release the exclusive lock on the source table and the intent exclusive lock on the target table, wherein concurrently running queries over the target table continue to run without considering the new partition until the intent exclusive lock and the exclusive lock are released.

7. The computer program product of claim 6, wherein the obtain the exclusive lock on the source table and the obtain the intent exclusive lock on the target table comprise:

receive an issuance of an attach command;
determine whether pre-determined requirements for the source table and the target table are met; and
in response to determining that the pre-determined requirements for the source table and the target table are met, obtain the exclusive lock on the source table and obtaining the intent exclusive lock on the target table.

8. The computer program product of claim 6, wherein compiled forms of queries are cached for reuse on the target table, wherein the obtaining the exclusive lock on the source table and the obtaining the intent exclusive lock on the target table further comprise:

performing soft invalidation of the compiled queries on the target table by marking cached entries as invalid for new use.

9. A computer program product for attaching a partition online to a range partitioned table, the computer program product comprising:

a computer readable storage memory having computer readable program code embodied therewith, the computer readable program code configured to:
receive a query to be run on a target table;
determine whether the query requires creation of one or more partitions on the target table;
in response to determining that the query requires the creation of the one or more partitions on the target table, determine whether an attach operation on the target table is in progress;
in response to determining that the attach operation on the target table is in progress:
queue the query;
obtain an exclusive lock on one or more source tables;
obtain an intent exclusive lock on the target table;
attach the source table to the target table as a new partition of the target table;
modify indices and table structure of the target table to reflect the attaching of the new partition; and
release the exclusive lock on the source table and the intent exclusive lock on the target table,
wherein concurrently running queries over the target table continue to run without considering the new partition until the intent exclusive lock and the exclusive lock are released, comprising:
determine a query execution timestamp; and
perform the query on target table partitions existing before the query execution timestamp.

10. The computer program product of claim 9, further comprising:

after the release of the intent exclusive lock and the exclusive lock, perform the queued query on the modified target table.

11. A system, comprising:
a processor; and a computer readable storage memory having computer readable program code embodied therewith, the computer readable program code configured to:
begin a child transaction;
obtain an exclusive lock on one or more source tables;
obtain an intent exclusive lock on a target table;
acquire a mutex controlling a dictionary partition list of the target table;
set an online alter flag indicating that an attach operation is in progress;
attach the source table to the target table as a new partition of the target table;
update a target table catalog to reflect the table structure of the modified target table;
modify indices for the target table in the catalog to reflect the new partition;
remove catalog entries for the source table;
update the dictionary partition list with new partition information and a timestamp associated with the new partition;
unset the online alter flag;
release the mutex;
commit the child transaction; and
release the exclusive lock on the source table and the intent exclusive lock on the target table, wherein concurrently running queries over the target table continue to run without considering the new partition until the intent exclusive lock and the exclusive lock are released.

12. A system, comprising:
a processor; and
a computer readable storage memory having computer readable program code embodied therewith, the computer readable program code configured to:
receive a query to be run on a target table;
determine whether the query requires creation of one or more partitions on the target table;
in response to determining that the query requires the creation of the one or more partitions on the target table, determine whether an attach operation on the target table is in progress;
in response to determining that the attach operation on the target table is in progress:
 queue the query;
 obtain an exclusive lock on one or more source tables;
 obtain an intent exclusive lock on the target table;
 attach the source table to the target table as a new partition of the target table;
 modify indices and table structure of the target table to reflect the attaching of the new partition; and
 release the exclusive lock on the source table and the intent exclusive lock on the target table,
wherein concurrently running queries over the target table continue to run without considering the new partition until the intent exclusive lock and the exclusive lock are released, comprising:
 determine a query execution timestamp; and
 perform the query on target table partitions existing before the query execution timestamp.

* * * * *

UNITED STATES PATENT AND TRADEMARK OFFICE
CERTIFICATE OF CORRECTION

Page 1 of 1

PATENT NO. : 8,615,503 B2
APPLICATION NO. : 13/174823
DATED : December 24, 2013
INVENTOR(S) : Lynette D. Adayilamuriyil It is certified that error appears in the above-identified patent and that said Letters Patent is hereby corrected as shown below:

Title Page, Item (12) "Adyilamuriyil" should read -- Adayilamuriyil --

Title Page, Item (75) Inventor name "Lynette D. Adyilamuriyil" should read -- Lynette D. Adayilamuriyil --

Signed and Sealed this
Fifteenth Day of April, 2014

Michelle K. Lee
*Deputy Director of the United States Patent and Trademark Office*